United States Patent
Kunz et al.

(10) Patent No.: US 9,071,097 B2
(45) Date of Patent: Jun. 30, 2015

(54) ELECTRIC GENERATOR

(75) Inventors: Alexander Kunz, Heidenheim (DE);
Gunter Zwarg, Berlin (DE); Ludger Kodding, Heidenheim (DE); Holger Henning, Giengen (DE); Thomas Hildinger, Parnaiba (BR); Markus Wolf, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 83 days.

(21) Appl. No.: 13/393,652

(22) PCT Filed: Sep. 21, 2010

(86) PCT No.: PCT/EP2010/005761
§ 371 (c)(1),
(2), (4) Date: May 2, 2012

(87) PCT Pub. No.: WO2011/047761
PCT Pub. Date: Apr. 28, 2011

(65) Prior Publication Data
US 2012/0205995 A1    Aug. 16, 2012

(30) Foreign Application Priority Data
Oct. 21, 2009   (DE) .......................... 10 2009 050 004

(51) Int. Cl.
*H02K 9/19*    (2006.01)
*H02K 5/10*    (2006.01)
*H02K 9/08*    (2006.01)

(52) U.S. Cl.
CPC .. *H02K 9/19* (2013.01); *H02K 5/10* (2013.01); *H02K 9/08* (2013.01); *H02K 2205/09* (2013.01)

(58) Field of Classification Search
USPC .................... 310/54, 58, 59, 64, 87
See application file for complete search history.

(56) References Cited

U.S. PATENT DOCUMENTS

| | | | | |
|---|---|---|---|---|
| 3,566,142 A * | 2/1971 | Dabell et al. | ........... | 290/1 R |
| 3,624,432 A * | 11/1971 | Merz | ........... | 310/53 |
| 3,675,056 A * | 7/1972 | Lenz | ........... | 310/54 |
| 4,341,093 A * | 7/1982 | Oishi et al. | ........... | 62/505 |
| 4,464,593 A * | 8/1984 | Kofink | ........... | 310/58 |
| 5,293,089 A * | 3/1994 | Frister | ........... | 310/54 |
| 6,046,520 A * | 4/2000 | Betsch et al. | ........... | 310/54 |

(Continued)

FOREIGN PATENT DOCUMENTS

| | | |
|---|---|---|
| AT | 264652 | 9/1968 |
| CN | 101183805 | 5/2008 |

(Continued)

OTHER PUBLICATIONS

EPO translation of DE 3528347 A1, Wuestenhoefer et al., Feb. 1987, All pages.*

(Continued)

*Primary Examiner* — Naishadh Desai
(74) *Attorney, Agent, or Firm* — Farjami & Farjami LLP

(57) ABSTRACT

The invention relates to an electric generator, comprising
a rotor;
a stator enclosing the rotor;
a housing;
a water-operated cooling device, comprising a water inlet and a water outlet and channels in the rotor and stator for guiding cooling water through the same;
the housing is enclosed;
the water-operated cooling device is the only cooling device of the generator.

1 Claim, 4 Drawing Sheets

(56) References Cited

U.S. PATENT DOCUMENTS

| | | | |
|---|---|---|---|
| 8,134,260 B2 * | 3/2012 | Hassett et al. | 310/60 R |
| 8,198,764 B2 * | 6/2012 | Booth et al. | 310/64 |
| 8,310,126 B1 * | 11/2012 | Hopkins et al. | 310/216.079 |
| 2005/0168081 A1 * | 8/2005 | Takenaka et al. | 310/64 |
| 2005/0264113 A1 * | 12/2005 | Suzuki et al. | 310/80 |
| 2007/0063594 A1 * | 3/2007 | Huynh | 310/59 |
| 2008/0193275 A1 * | 8/2008 | De Filippis et al. | 415/10 |
| 2008/0238224 A1 * | 10/2008 | Ressel | 310/64 |

FOREIGN PATENT DOCUMENTS

| | | | | |
|---|---|---|---|---|
| DE | 23 54 690 | | 7/1975 | |
| DE | 35 28 347 | | 2/1987 | |
| DE | 3528347 | A1 * | 2/1987 | H02K 9/19 |
| DE | 39 41 474 | | 6/1991 | |
| DE | 198 54 465 | | 3/2000 | |
| DE | 10 2008 007 414 | | 8/2008 | |
| NL | 37774 | | 3/1936 | |

OTHER PUBLICATIONS

German Office Action dated Aug. 2, 2013 for German Patent Application No. 10 2009 050 004.9.

Chinese Office Action dated Jul. 16, 2013 for Chinese Patent Application No. 201080041497.1.

Chinese Office Action dated Mar. 21, 2014 for Chinese Patent Application No. 201080041497.1.

English Translation of Chinese Office Action dated Jun. 17, 2014 for Chinese Patent Application No. 201080041497.1.

Chinese Office Action dated Jun. 17, 2014 for Chinese Patent Application No. 201080041497.1.

Japanese Office Action dated Aug. 25, 2014 for Japanese Patent Application No. 2012-534561.

Chinese Office Action dated Nov. 5, 2014 for Chinese Patent Application No. 201080041497.1.

English Translation of Chinese Office Action dated Nov. 5, 2014 for Chinese Patent Application No. 201080041497.1.

* cited by examiner

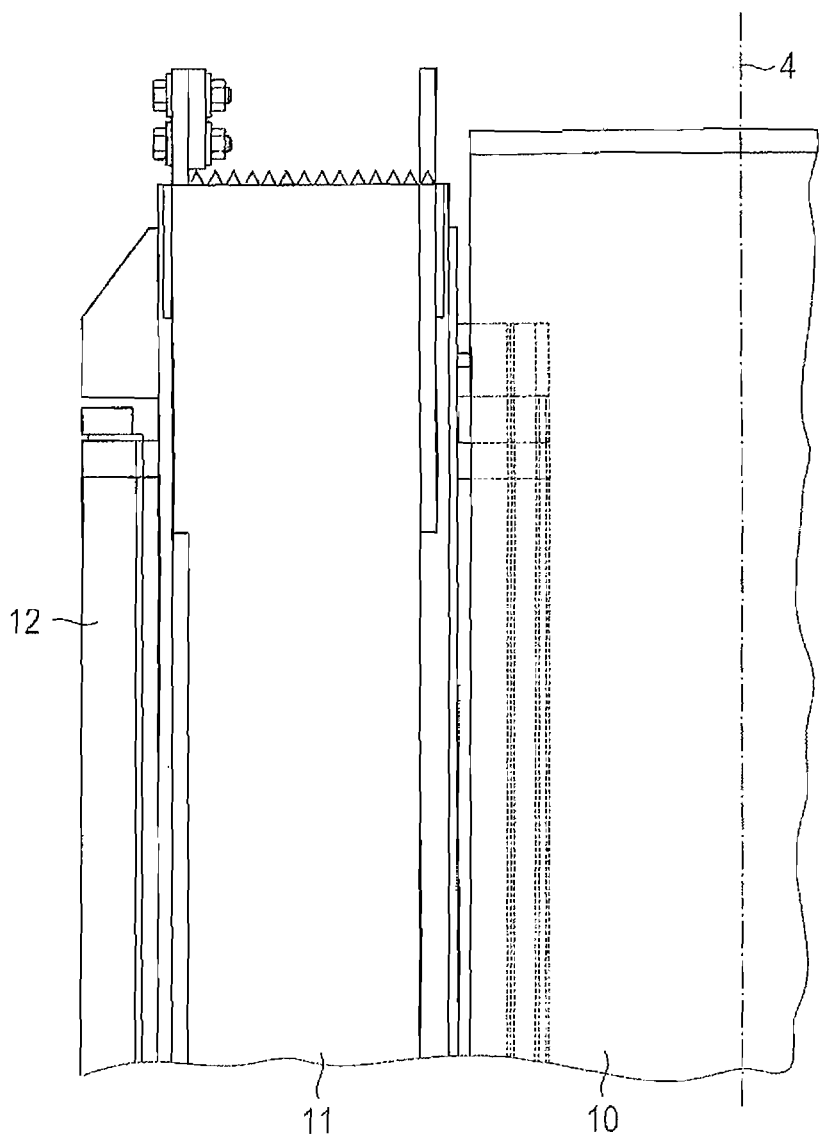

ELECTRIC GENERATOR

This is a U.S. national phase application, which is based on, and claims priority from, PCT application Serial No. PCT/EP2010/005761, filed Sep. 21, 2010, which claims priority from foreign application Serial No. 10 2009 050 004.9, filed Oct. 21, 2009, in Germany.

The invention relates to an electric generator, especially for a hydroelectric installation with a water turbine which drives the generator. The invention especially relates to the cooling system of the generator.

Such a generator is known from DE 10 2009 19 295 A1 for example.

A generator comprises a rotor and further a stator enclosing the rotor. It is arranged as a core stack for example. Rotor and stator are enclosed by a housing. The cooling device is operated both with air and water as the cooling medium.

For this purpose the housing has an inlet for cooling water. Rotor and stator contain channels through which the cooling water can be guided. The cooling water enters at the cooling water inlet, flows through the aforementioned channels, and leaves the housing again through a cooling water outlet.

Similarly, cooling air is introduced through a cooling air inlet into the housing, flows through the cavities that are contained in the generator and around the rotor and stator, heats itself up in this process and leaves the housing at a cooling air outlet.

Such a cooling device operated with cooling air and cooling water is problematic. The cooling achieved thereby is frequently insufficient. An impermissible heating of the involved components of the generator will occur, leading to its occasional failure.

The invention is based on the object of providing an electric generator of the kind mentioned above in such a way that cooling becomes more efficient and will therefore be sufficient to keep all components of the generator beneath the highest permissible temperature. Furthermore, the complexity of the installations in connection with cooling shall be reduced.

This object is achieved by an electric generator which has the features of claim 1.

Accordingly, the housing of the generator is sealed. The cooling device exclusively comprises a water cooling device and no air cooling device.

The inventor has recognized that the air cooling device can be omitted when the housing of the generator is sealed. He has recognized the following reasons for this purpose: in the case of a generator in accordance with the invention, the air which is enclosed by the housing and which surrounds the rotor and the stator will heat up strongly, namely more strongly than in conventional generators in which the air flows past the generator. Accordingly, there is a large temperature gradient between the temperature of the cooling water and the temperature of the air enclosed in the housing. The heat transfer from the air to the cooling water is therefore especially good. The cooling water absorbs the heat quantity contained in the air and discharges the same reliably. It may be appropriate or necessary in this respect to increase the throughput of cooling water. This is no problem however.

The advantages arising from the invention are the following:

The cooling system which is operated only with water is efficient to such an extent that overheating of the actual components of the generator is excluded, which also applies to large high-power machines such as from 300 MVA for example.

Since the cooling air device is omitted, the investment costs are much lower than in conventional generators; no air connections are required on the housing and no pipelines for the heat exchange between water and air.

The need for space for the generator will also decrease.

The invention and the state of the art will be explained below in closer detail by reference to the drawings, which show in detail as follows:

FIG. 4 shows an enlarged sectional view of a salient-pole machine.

Figure 1:
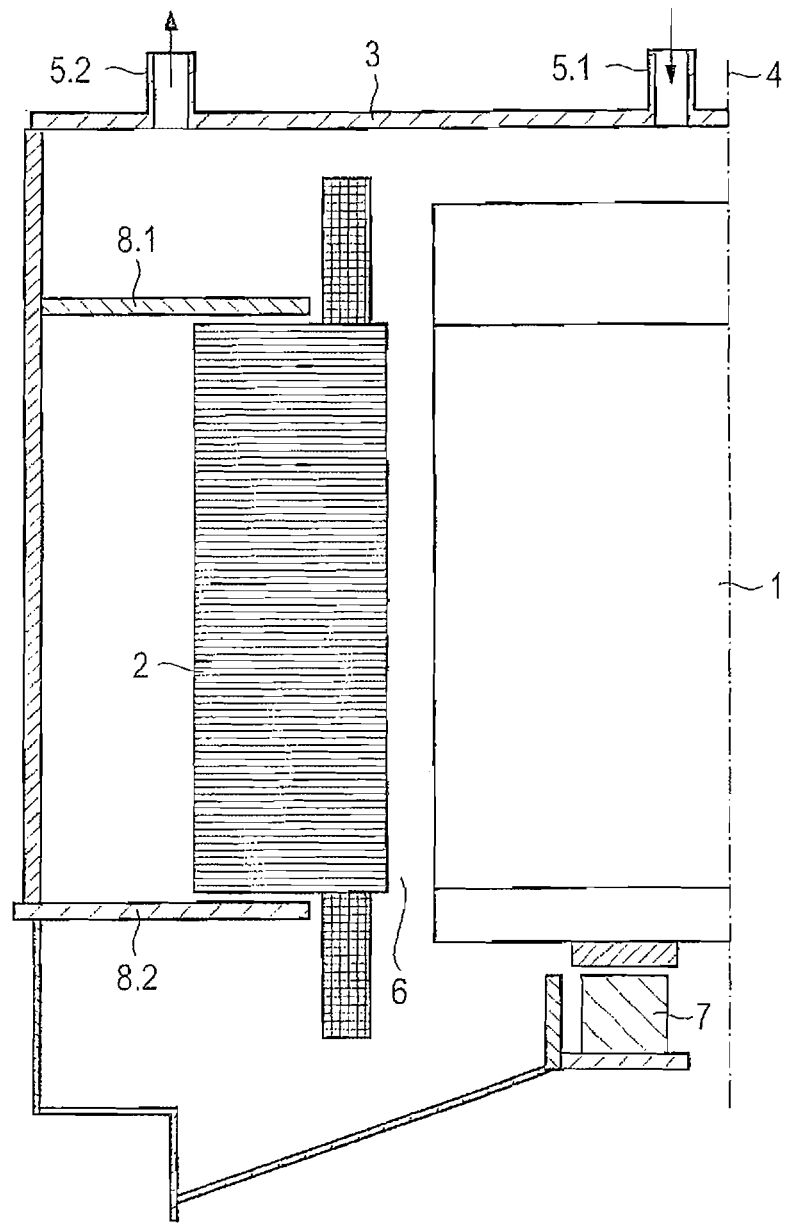
FIG. 1 shows an axial sectional view of a rotor in accordance with the invention in a schematic view.

The generator shown in FIG. 1 comprises a rotor 1, a stator 2 and a housing 3. The shaft is not shown, but merely the rotational axis 4.

The cooling device is the most important element in accordance with the invention. It is operated exclusively with water. The housing 3 comprises a water inlet 5.1 and a water outlet 5.2. The progression of the cooling water is not shown. It is understood however that the cooling water flows through channels in rotor 1 and stator 2, and optionally also through a winding overhang which is not shown here.

Air is enclosed in the housing (see the air gap between rotor 1 stator 2 for example). The enclosed air will strongly heat up during operation because there is no external air flow circuit, but merely an external water flow circuit. As a result of the high temperature gradients between air and water, there is a highly efficient heat transfer between air and water. The cooling water entrains the heat and discharges it to the outside. A heat exchanger will generally be arranged there which reduces the temperature of the cooling water.

For the sake of completeness, reference is made to further components of the generator. A brake 7 is provided, and also two pressure plates 8.1, 8.2.

When reference is made herein to an enclosed housing then this shall not mean that the housing 3 is hermetically sealed against the external environment. It is possible to provide gaps caused by production which also allow the inlet and outlet of air. The throughput of air is exceptionally low so that it is irrelevant. It is relevant that the main quantity of the air remains in the space enclosed by the housing 3. Leakage is so low that there is no relevant exchange of air. More than 50% of the air volume enclosed in the housing will still be present for example after one hour of operation.

The housing can comprise an air inlet and an air outlet. At least one of these two outlets should be adjustable or controllable, so that a defined air leakage can be achieved.

Figure 2:
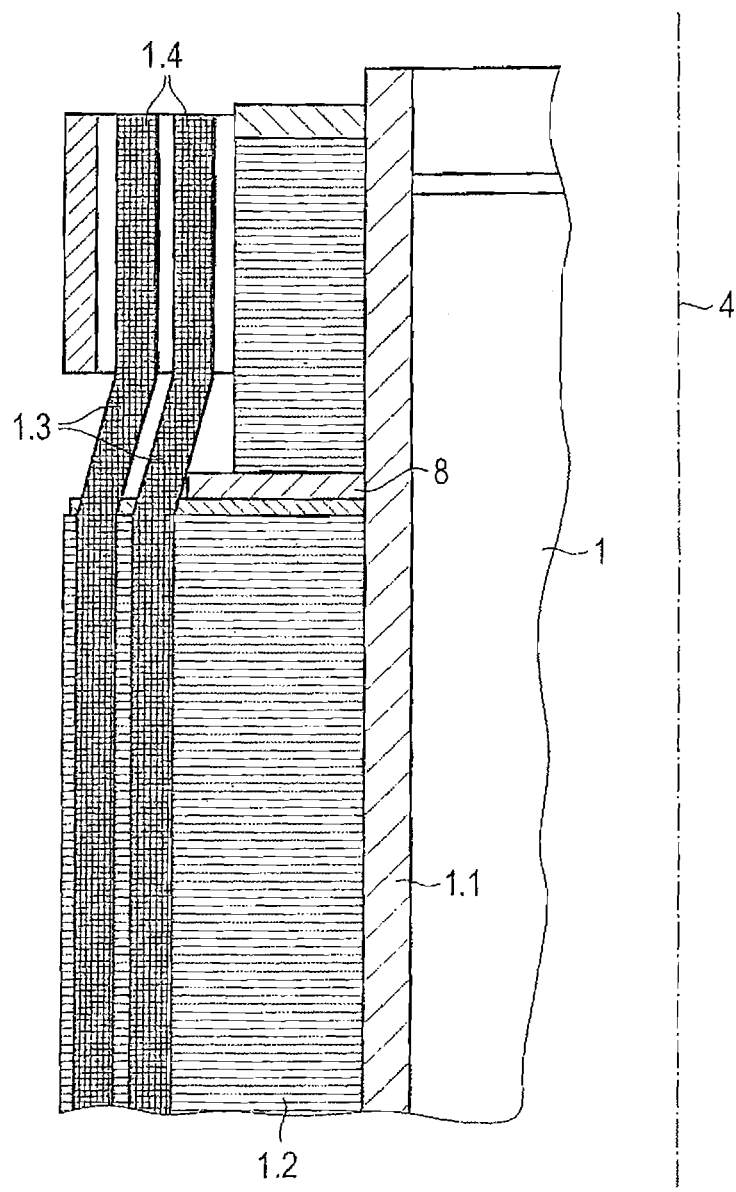
FIG. 2 shows an axial sectional view of an electric generator according to the state of the art.

The generator according to FIG. 2 comprises a rotor 1. A hub 1.1 carries a rotor core stack 1.2. It is axially clamped by means of a pressure plate 8. Windings 1.3 are inserted into the grooves of the rotor cores. They protrude with axial middle heads from the rotor core stack 1.2. The hub 1.1 carries the winding overhangs 1.4 at its axial end (at the top in the illustration). The rotor 1 revolves about the rotational axis 4.

Figure 3:
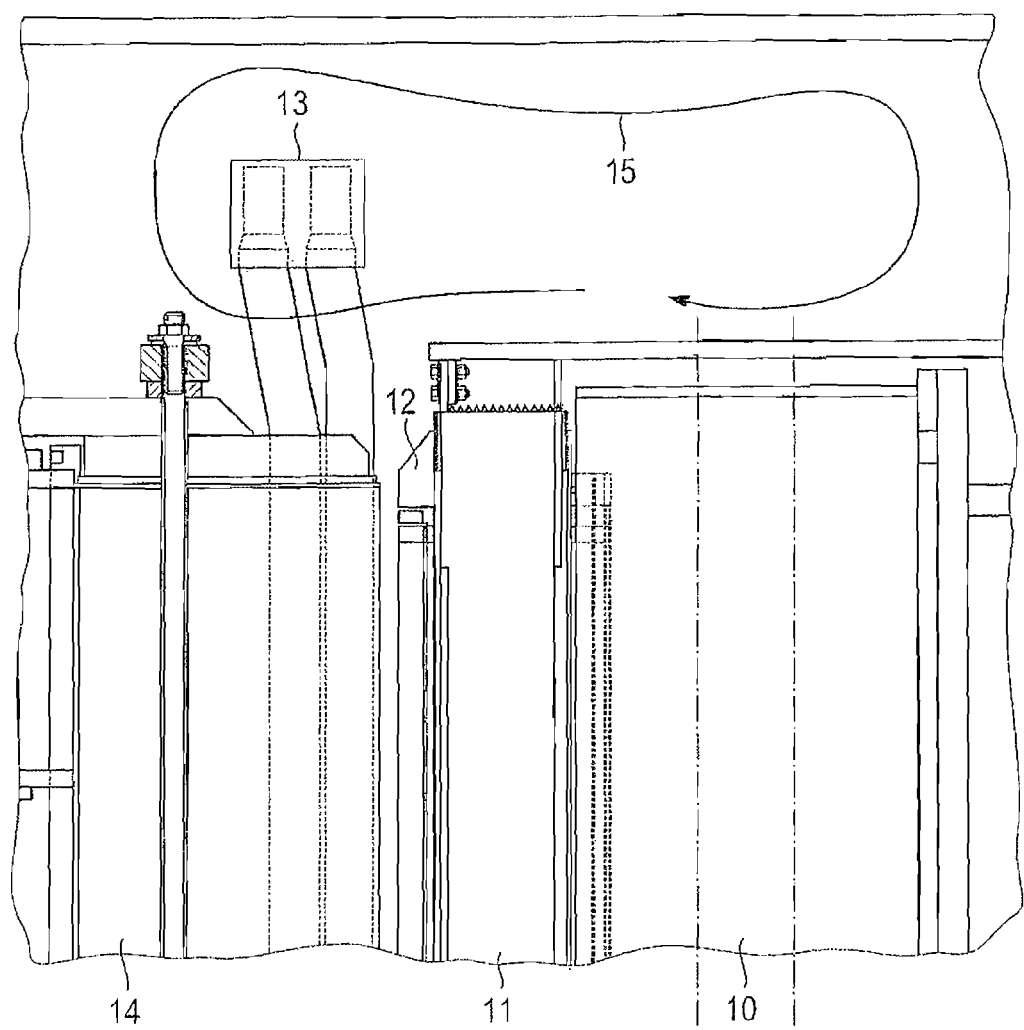
FIG. 3 shows an axial sectional view of a rotor in accordance with the invention of a salient-pole machine.

The generators shown in FIGS. 3 and 4 are salient-pole machines.

FIG. 3 shows a segmental rim 10, the pole winding 11, the pole shoe 12, the winding overhang 13 and the stator 14.

An air flow in the form of an eddy 15 occurs at the face ends of the segmental rim 10 and the stator 14.

LIST OF REFERENCE NUMERALS

1 Rotor
1.1 Hub 1.2 Rotor core stack
1.3 Windings
1.4 Winding overhangs
2 Stator
3 Housing
4 Rotational axis
5.1 Water inlet
5.2 Water outlet
6 Air gap
7 Brake
8 Pressure plate
8.1 Pressure plate
8.2 Pressure plate
10 Segmental rim
11 Pole winding
12 Pole shoe
13 Winding overhang
14 Stator
15 Eddy

The invention claimed is:

1. An electric generator comprising:
a sealed housing to prevent a significant flow of air into the sealed housing and exiting the sealed housing, the sealed housing including:
a rotor having channels;
a stator enclosing the rotor;
a water operated cooling device, comprising a water inlet for allowing cooling water to enter the sealed housing, and a water outlet for allowing the cooling water to discharge from the sealed housing, wherein the water operated cooling device is the only cooling device of the generator;
wherein the channels in the rotor and the stator guide the cooling water through the rotor and the stator for the cooling water to absorb the heat in the rotor and the stator that heat up during operation of the electric generator;
wherein the sealed housing includes internal air, wherein the internal air heats up during operation of the electric generator, wherein the cooling water absorbs the heat contained in the internal air in the sealed housing, and wherein the cooling water discharges the heat absorbed from the rotor, the stator and the internal air through the water outlet to outside of the sealed housing;
wherein the sealed housing comprises an air inlet and an air outlet, at least one of the air inlet and the air outlet is provided with an adjustable opening width for adjusting air leakage, wherein except for the air inlet and the air outlet the sealed housing is hermetically sealed;
a heat exchanger arranged to receive and reduce the temperature of the cooling water discharged through the water outlet.

* * * * *

UNITED STATES PATENT AND TRADEMARK OFFICE
CERTIFICATE OF CORRECTION

| | | |
|---|---|---|
| PATENT NO. | : 9,071,097 B2 | Page 1 of 1 |
| APPLICATION NO. | : 13/393652 | |
| DATED | : June 30, 2015 | |
| INVENTOR(S) | : Kunz et al. | |

It is certified that error appears in the above-identified patent and that said Letters Patent is hereby corrected as shown below:

In the claims,

Column 4, line 10, "scaled" should be changed to --sealed--

Signed and Sealed this
Fifteenth Day of September, 2015

Michelle K. Lee
*Director of the United States Patent and Trademark Office*